US008554363B2

(12) United States Patent
Sperry et al.

(10) Patent No.: US 8,554,363 B2
(45) Date of Patent: Oct. 8, 2013

(54) APPARATUS CONFIGURED TO DISPENSE A PLURALITY OF CONNECTED INFLATABLE STRUCTURES AND ASSOCIATED SYSTEM AND METHOD

(75) Inventors: Laurence Sperry, Newton, MA (US); Christopher DiTonno, Wakefield, MA (US); Jason Lepine, Dedham, MA (US)

(73) Assignee: Sealed Air Corporation, Elmwood Park, NJ (US)

( * ) Notice: Subject to any disclaimer, the term of this patent is extended or adjusted under 35 U.S.C. 154(b) by 230 days.

(21) Appl. No.: 12/886,937

(22) Filed: Sep. 21, 2010

(65) Prior Publication Data

US 2012/0072016 A1 Mar. 22, 2012

(51) Int. Cl.

*G06F 17/00* (2006.01)
*B65D 83/00* (2006.01)
*B65H 20/00* (2006.01)

(52) U.S. Cl.

USPC ........... 700/232; 700/231; 700/243; 700/244; 221/199; 221/258

(58) Field of Classification Search

USPC .......... 700/231, 232, 240, 243, 244; 221/199, 221/258

See application file for complete search history.

(56) References Cited

U.S. PATENT DOCUMENTS

| | | | | |
|---|---|---|---|---|
| 4,413,463 | A * | 11/1983 | Lancaster | 53/399 |
| 5,181,365 | A * | 1/1993 | Garvey et al. | 53/455 |
| 5,605,430 | A * | 2/1997 | Legrady | 414/412 |
| 5,679,208 | A * | 10/1997 | Sperry et al. | 156/515 |
| 5,699,653 | A * | 12/1997 | Hartman et al. | 53/455 |
| 5,942,076 | A | 8/1999 | Salerno et al. | |
| 6,582,800 | B2 * | 6/2003 | Fuss et al. | 428/178 |
| 6,598,373 | B2 | 7/2003 | Sperry et al. | |
| 6,651,406 | B2 | 11/2003 | Sperry et al. | |
| 6,804,933 | B2 | 10/2004 | Sperry et al. | |
| 6,820,785 | B2 * | 11/2004 | Kapiloff | 225/14 |
| 6,892,620 | B2 * | 5/2005 | Kapiloff | 83/649 |
| 7,225,599 | B2 | 6/2007 | Sperry et al. | |
| 7,389,626 | B2 | 6/2008 | Sperry et al. | |
| 7,950,433 | B2 * | 5/2011 | Sperry et al. | 156/361 |
| 2006/0059865 | A1 * | 3/2006 | Yampolsky et al. | 53/403 |
| 2006/0090421 | A1 | 5/2006 | Sperry et al. | |
| 2006/0289108 | A1 | 12/2006 | McNamara et al. | |
| 2007/0117704 | A1 | 5/2007 | Toth | |
| 2009/0049798 | A1 * | 2/2009 | Lorsch | 53/79 |
| 2009/0308965 | A1 * | 12/2009 | Piucci et al. | 242/526 |
| 2010/0096290 | A1 | 4/2010 | Frayne et al. | |

OTHER PUBLICATIONS

International Search Report and Written Opinion of the International Searching Authority dated Feb. 6, 2012 for corresponding Application No. PCT/US2011/043801.

* cited by examiner

*Primary Examiner* — Michael K Collins
(74) *Attorney, Agent, or Firm* — Alston & Bird LLP

(57) ABSTRACT

An apparatus configured to dispense a plurality of connected inflatable structures is provided. The apparatus may include a motor which is configured to advance a dispensing device to thereby advance the connected inflatable structures. A sensor is configured to detect a pulling force applied to the dispensing device and configured to output a signal corresponding to the pulling force. A controller is configured to receive the signal and output a control signal to direct the motor to advance the dispensing device in response to the signal to thereby dispense the connected inflatable structures. A related system includes the apparatus in addition to an inflation device configured to inflate the connected inflatable structures and an accumulation bin configured to store the connected inflatable structures. A related method is also provided.

21 Claims, 8 Drawing Sheets

APPARATUS CONFIGURED TO DISPENSE A PLURALITY OF CONNECTED INFLATABLE STRUCTURES AND ASSOCIATED SYSTEM AND METHOD

BACKGROUND OF THE INVENTION

1. Field of the Invention

The present invention generally relates to dispensing inflatable structures, and in particular to dispensing connected inflatable structures using a dispensing device and an associated system and method.

2. Description of Related Art

Inflatable structures constitute an important part of the packaging industry. Inflatable structures are commonly used as cushions to package items, either by wrapping the items in the inflatable structures and placing the wrapped items in a shipping container, or by simply placing one or more inflatable structures inside of a shipping container along with an item to be shipped. The cushions protect the packaged item by absorbing impacts that might otherwise be fully transmitted to the packaged item during transit, and also restrict movement of the packaged item within the container to further reduce the likelihood of damage to the item.

Inflatable packaging has an advantage over non-inflatable packaging in that inflatable packaging may require less raw material to manufacture it. Further, it is known within the art to make inflatable packaging such that it is inflatable on demand. Inflate-on-demand packaging allows the entity using the packaging materials to wait and inflate the packaging materials when needed, such as when shipping an item in a shipping container, as described above. This means that inflate-on-demand packaging materials occupy less space as compared to pre-inflated packaging materials, which makes them easier to store. Additionally, transportation of the packaging materials to the entity using them to package items can be less expensive than it would be if the packaging materials were already inflated because they can be shipped in significantly smaller containers.

Despite the advantages of inflate-on-demand packaging, there is still room for improvement within the art. In this regard, the persons who use the inflatable structures to package items may desire that the inflatable structures be provided to them in a rapid, yet controlled manner during the packaging process. Further, some embodiments of inflatable structures are connected and thus the packaging person may need to separate the inflatable structures at desired intervals. Accordingly, embodiments of the present invention are configured to provide the inflatable containers to persons in a manner which facilitates use of the inflatable structures in packaging and other applications.

BRIEF SUMMARY OF THE INVENTION

These and other advantages are provided by the apparatus, system, and method presented herein. In particular, an operator is provided with a convenient way to receive and remove a desired section of inflatable structures from a plurality of connected inflatable structures. Thereby, for example, use of the inflatable structures in packaging may be simplified and expedited.

In particular, there is herein provided in one embodiment an apparatus configured to dispense a plurality of connected inflatable structures. The apparatus may comprise a dispensing device configured to advance the connected inflatable structures, a motor configured to advance the dispensing device, a sensor configured to detect a pulling force applied to the dispensing device and configured to output a signal corresponding to the pulling force, and a controller configured to receive the signal and output a control signal to direct the motor to advance the dispensing device in response to the signal to thereby dispense the connected inflatable structures.

The apparatus may further comprise a plurality of projections extending from the dispensing device, wherein the projections are configured to engage the connected inflatable structures. The projections may extend a distance from the dispensing device and the distance may vary with an axial position along the dispensing device. Further, the projections may define a U-shape such that the distance defined at a first axial position is less than the distance defined at a second axial position and a third axial position, wherein the first axial position is located between the second axial position and the third axial position. Additionally, in some embodiments the connected inflatable structures may comprise slits.

Also, the apparatus may comprise an input device configured to cause the motor to advance the dispensing device. The input device may be configured to detect an actuation force applied thereto and configured to control a rate at which the motor advances the dispensing device based on the actuation force. Actuation of the input device for a time period greater than a threshold time period may be configured to cause the motor to advance the dispensing device until actuation of the input device ceases. Further, actuation of the input device for a second time period which is less than the threshold time period may be configured to cause the motor to advance the dispensing device to dispense a predetermined number of the connected inflatable structures.

The sensor may in some embodiments comprise a strain gauge. Alternatively or additionally the sensor may comprise a rotary movement sensor configured to detect a rotational movement of the dispensing device and thereby the signal may correspond to the rotational movement. The rotary movement sensor may comprise a Hall Effect sensor in some embodiments, whereas in other embodiments the rotary movement sensor may comprise a back electromotive force sensor. Further, the controller may be configured to direct the motor to advance the dispensing device after a delay period in instances in which the rotational movement, as indicated by the signal, is less than a predetermined threshold. The controller may additionally be configured to direct the motor to advance the dispensing device substantially instantaneously in instances in which the rotational movement, as indicated by the signal, is greater than a predetermined threshold. Also, the controller may be configured to direct the motor to advance the dispensing device to dispense a first predetermined number of the connected inflatable structures in instances in which the rotational movement, as indicated by the signal, is less than a predetermined threshold, and the controller may be configured to direct the dispensing device to dispense a second predetermined number of the connected inflatable structures in instances in which the rotational movement, as indicated by the signal, is greater than the predetermined threshold. In some embodiments the second predetermined number of the connected inflatable structures is greater than the first predetermined number of connected inflatable structures. Further, at least one of the first predetermined number of the connected inflatable structures and the second predetermined number of the connected inflatable structures may be user-selectable.

There is further herein provided a system configured to dispense a plurality of connected inflatable structures. The system may comprise the above-described apparatus and an inflation device configured to inflate the connected inflatable structures. Further, the system may include an accumulation bin, wherein the accumulation bin is positioned downstream of the inflation device and upstream of the apparatus configured to dispense the connected inflatable structures. Further, the system may include a inflatable structure sensor configured to detect the connected inflatable structures positioned downstream of the inflation device and upstream of the apparatus configured to dispense the connected inflatable structures and configured to output a inflatable structure sensor signal indicating whether or not the connected inflatable structures are present, wherein the controller is configured to not direct the motor to advance the dispensing device in instances in which the inflatable structure sensor signal indicates that the connected inflatable structures are not present.

There is further herein provided a method of dispensing a plurality of connected inflatable structures. The method may comprise providing for pulling the connected inflatable structures and thereby applying a pulling force to a dispensing device about which the connected inflatable structures are positioned, detecting the pulling force applied to the dispensing device, and advancing the dispensing device in response to the pulling force to thereby dispense the connected inflatable structures. In some embodiments of the method, the connected inflatable structures may comprise slits.

The method may further comprise delaying advancing the dispensing device for a delay period in instances in which a duration of the pulling force is less than a predetermined threshold. Additionally, the method may comprise advancing the dispensing device substantially instantaneously in instances in which a duration of the pulling force is greater than a predetermined threshold. Also, the method may include dispensing a predetermined number of the connected inflatable structures. Further, the method may comprise dispensing a first predetermined number of the connected inflatable structures in instances in which the duration of the pulling force is less than a predetermined threshold, and dispensing a second predetermined number of the connected inflatable structures in instances in which the duration of the pulling force is greater than the predetermined threshold.

In a further embodiment a system configured to dispense a plurality of connected inflatable structures comprises an apparatus configured to dispense the connected inflatable structures comprising a dispensing device configured to advance the connected inflatable structures, a plurality of projections extending from the dispensing device, wherein the projections are configured to engage the connected inflatable structures, and wherein the projections extend a distance from the dispensing device and wherein the distance varies with an axial position along the dispensing device, and a motor configured to advance the dispensing device. The system may further comprise a controller configured to output a control signal to direct the motor to advance the dispensing device, and an inflation device configured to inflate the connected inflatable structures. The system may also comprise an accumulation bin, wherein the accumulation bin is positioned downstream of the inflation device and upstream of the apparatus configured to dispense the connected inflatable structures. Additionally, in some embodiments the projections define a U-shape such that the distance defined at a first axial position is less than the distance defined at a second axial position and a third axial position, wherein the first axial position is located between the second axial position and the third axial position.

These and other aspects and features of the invention may be better understood with reference to the following description and accompanying drawings.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
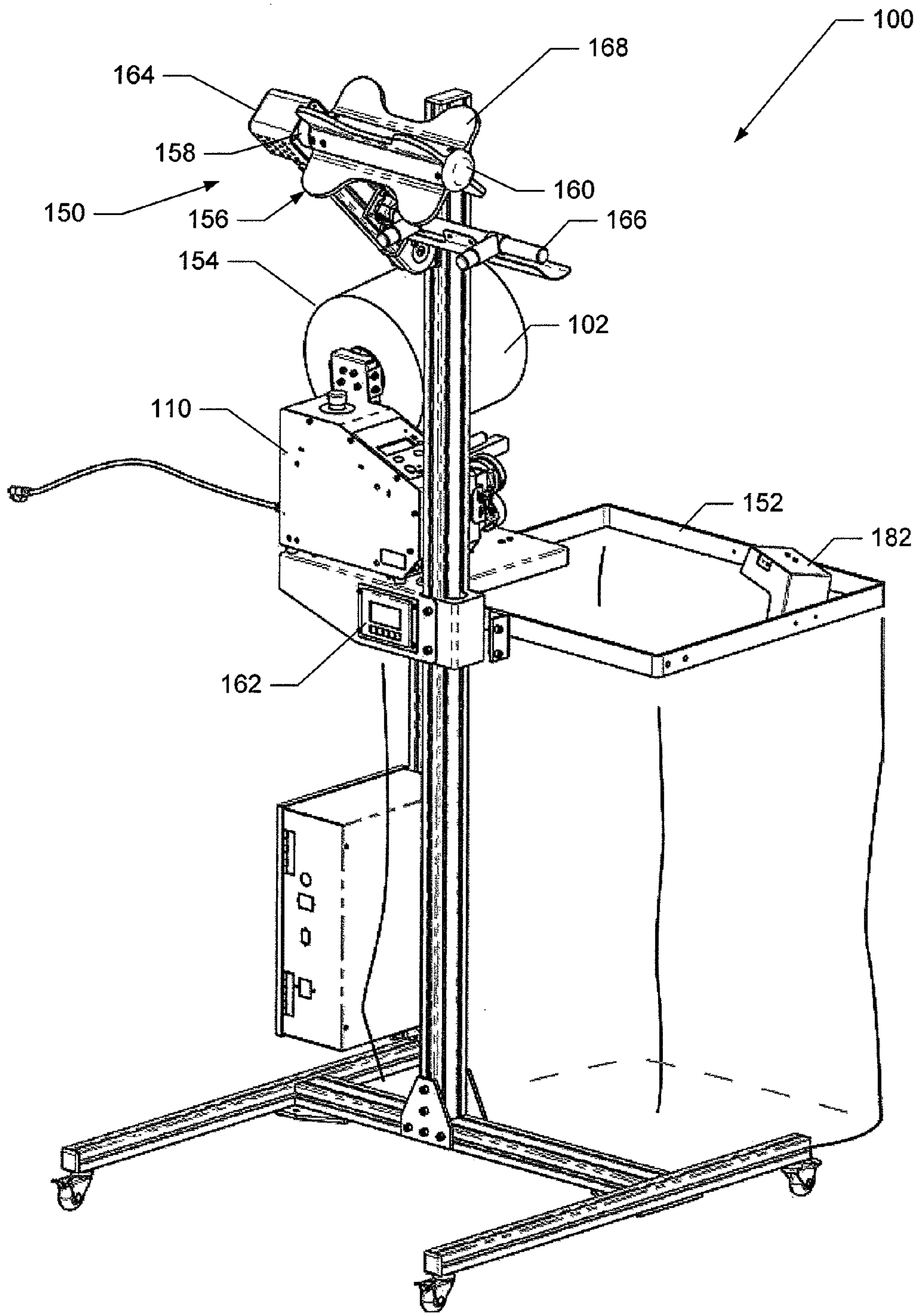
FIG. 1 illustrates a perspective view of a system configured to dispense a plurality of connected inflatable structures according to an example embodiment of the present invention, wherein the inflatable structures are not yet being dispensed by a dispensing device.

With reference to FIG. 1, there is provided a system 100 configured to dispense a plurality of connected inflatable structures 102. As will be described below, the inflatable structures 102 may in some embodiments comprise enclosed chambers formed from flexible film. For example, in some embodiments the connected inflatable structures 102 may comprise a single piece of flexible film which has been formed into the inflatable structures 102. Example embodiments of inflatable structures 102 which may be dispensed by the system 100 are provided in co-pending U.S. patent application Ser. No. 12/378,212, which is incorporated herein by reference. However, various other types of inflatable structures may be dispensed by the system 100.

Returning to the embodiment shown in FIG. 1, the system 100 may comprise an inflation device 110 which is configured to inflate the inflatable structures 102 and an apparatus 150 configured to dispense the inflatable structures. The system 100 may further comprise an accumulation bin 152 which may be configured to receive the inflatable structures 102. In some embodiments the accumulation bin 152 may be positioned downstream of the inflation device 110 and upstream of the apparatus 150 configured to dispense the inflatable structures 102. Thereby, the accumulation bin 152 may be configured to store the connected inflatable structures 102 after they have been inflated by the inflation device 110 and before they have been dispensed by the apparatus 150 configured to dispense the inflatable structures. For example, in some embodiments the apparatus 150 configured to dispense the inflatable structures 102 may be configured to dispense the connected inflatable structures at a rate faster than the rate at which the inflation device 110 is able to inflate the inflatable structures. In such embodiments the accumulation bin 152 may receive and store a buffer quantity of the inflatable structures 102 such that the inflatable structures may substantially always be available to the apparatus 150 configured to dispense the connected inflatable structures for dispensing.

In some embodiments the inflatable structures 102 may be provided to the inflation device 110 in an uninflated state. For example, in the illustrated embodiment the inflatable structures 102 are provided to the inflation device 110 in the form of a roll 154 comprising a continuous web of the connected inflatable structures. However, the inflatable structures 102 may be provided to the inflation device 110 in various other forms in other embodiments. For example, the inflatable structures 102 may be provided to the inflation device 110 in the form of a cartridge wherein the inflatable structures are fan-folded on top of one another.

However, the form in which the inflatable structures 102 are provided to the inflation device 110 and the type of inflatable structures themselves may depend upon the type of inflation device selected, or vice versa. In this regard, various embodiments of inflation devices 110 may be employed by the system 100 to inflate the inflatable structures 102. In some embodiments the inflation device 110 may employ inflation-at-a distance techniques to inflate the inflatable structures 102, whereas in other embodiments the inflation device may inflate the inflatable structures by inserting an inflation needle, wand, nozzle, or other similar structure in the inflatable structures. By way of example, various embodiments of inflation devices 110 which may be employed in embodiments of the system 100 are disclosed in U.S. Pat. Nos. 5,942,076; 6,598,373; 6,651,406; 6,804,933; and 7,225,599 and U.S. patent application Ser. Nos. 10/979,583; 11/732,571; 12/256,245; and 12/378,212, which are herein incorporated by reference. However, various other embodiments of the inflation device 110 may be employed by the system 100 as may be understood by one having skill in the art.

Turning now to the apparatus 150 configured to dispense the inflatable structures 102, the apparatus may comprise a dispensing device 156 configured to advance the inflatable structures. The apparatus 150 configured to dispense the inflatable structures 102 may comprise a variety of structures, components, and machines configured to advance the inflatable structures 102 and the motor 158 may comprise a variety of mechanisms configured to provide motion thereto. For example, the dispensing device 156 may comprise two or more wheels which form a nip through which the inflatable structures 102 travel. Thereby, when one or more of the wheels are driven, the dispensing device 156 dispenses the inflatable structures 102.

By way of further example, in the illustrated embodiment the dispensing device 156 comprises a cylindrical member 160 which is configured to be rotated by the motor 158. As will be described below in detail, a controller 162 may output a control signal directing the motor 158 to advance the dispensing device 156 in response to a signal outputted by a sensor. The sensor may in some embodiments be retained within a housing 164 which may also house the motor 158 and a gear train in some embodiments. Further, an alignment member 166 may be positioned upstream of the dispensing device 156 and configured to align the inflatable structures 102 with the dispensing device 156 as they are received from the accumulation bin 152 or directly from the inflation device 110. The dispensing device 156 and/or the alignment member 164 may be attached to the remainder of the apparatus 150 such that they supported on one side in a cantilevered arrangement. By cantilevering the dispensing device 156 and/or the alignment member 164, the loading the inflatable structures 102 though the alignment device and the dispensing device may be simplified and not require disassembly and reassembly. The apparatus 150 may further comprise a plurality of projections 168 extending from the dispensing device 156. The projections 168 may be configured to engage the connected inflatable structures 102 in order to assist in advancing the connected inflatable structures when the motor 158 advances the dispensing device 156.

Figure 2A:
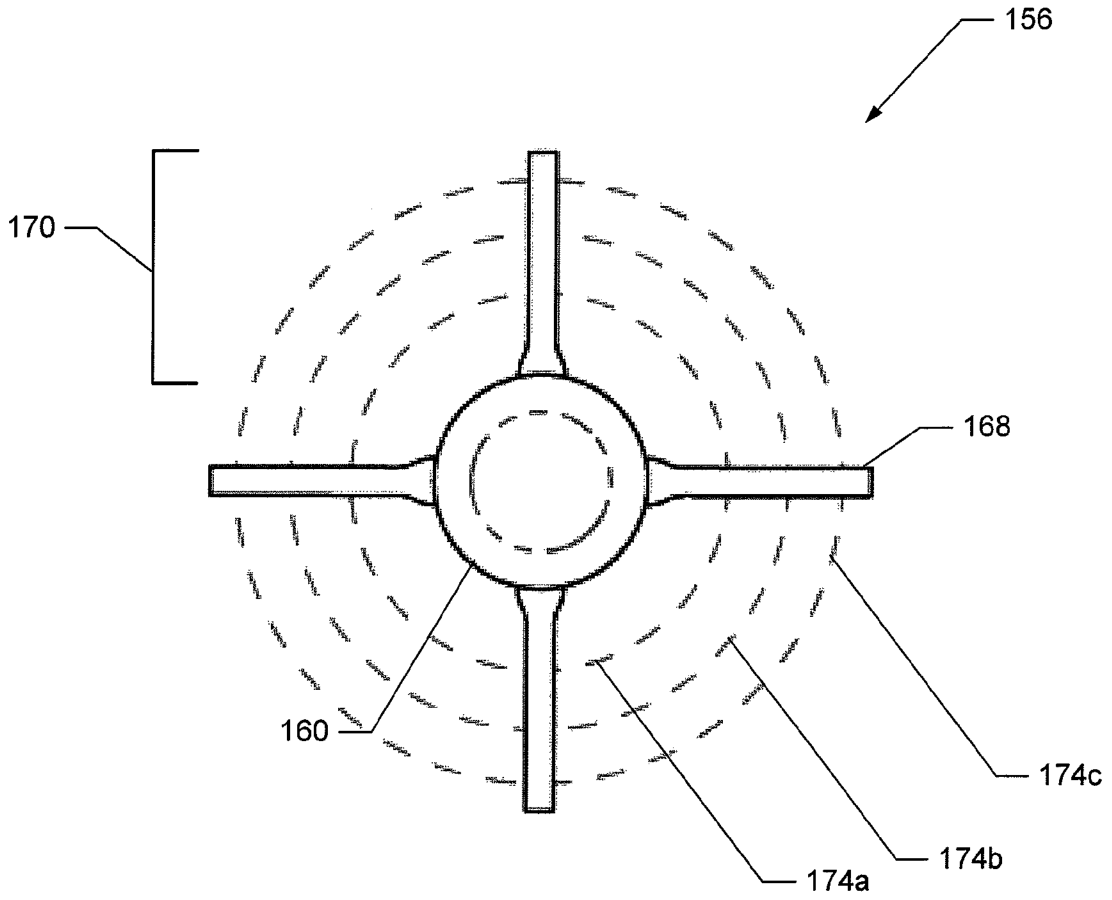
FIG. 2A illustrates an end view of the dispensing device according to an example embodiment of the present invention.
Figure 2B:
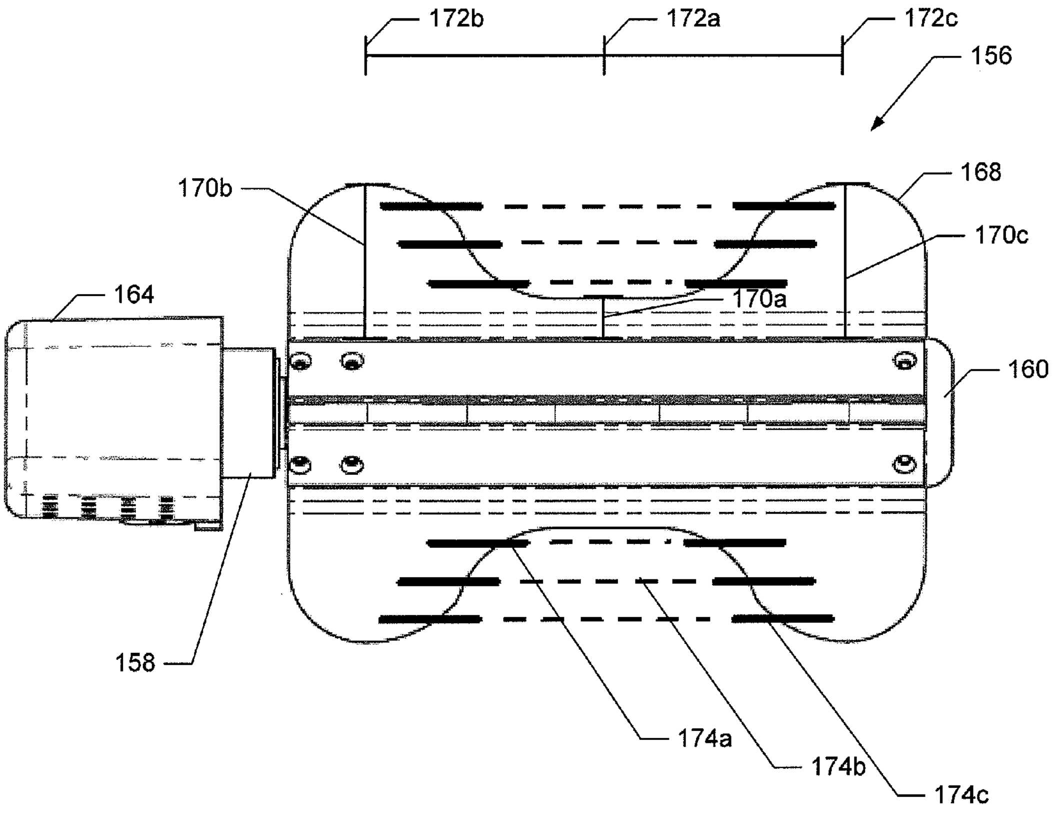
FIG. 2B illustrates a side view of the dispensing device according to an example embodiment of the invention.

Details with respect to the dispensing device 156 and the projections 168 are illustrated in FIGS. 2A and 2B. As illustrated in FIG. 2A, the projections 168 may in some embodiments extend substantially perpendicularly from the surface of the cylindrical member 160. In some embodiments the projections 168 may be coupled to the cylindrical member 160, whereas in other embodiments the projections may be integral with the cylindrical member. The projections 168 may extend a distance 170 from the dispensing device 156 which varies with axial position along the dispensing device, as illustrated in FIG. 2B. For example, in the illustrated embodiment the projections 168 each define a "U-shape" such that the distance 170*a* defined at a first axial position 172*a* is less than the distance 170*b* defined at a second axial position 172*b* and the distance 170*c* defined at a third axial position 172*c*, wherein the first axial position is located between the second axial position and the third axial position.

Accordingly, the above-described U-shape and various other configurations may effectively define a variable circumference dispensing device 156 depending upon the axial positions at which the inflatable structures 102 contact the projections 168. In this regard, the dashed lines in FIGS. 2A and 2B illustrate, by way of example, first 174*a*, second 174*b*, and third 174*c* positions at which the connected inflatable structures 102 may be positioned about the dispending device 156. As illustrated, the first 174*a*, second 174*b*, and third 174*c* positions define different circumferences with respect to the center of the cylindrical member 160 at which the inflatable structures 102 may be positioned. In this regard, the dispensing device 156 may accommodate inflatable structures 102 of different sizes and shapes.

Figure 3:
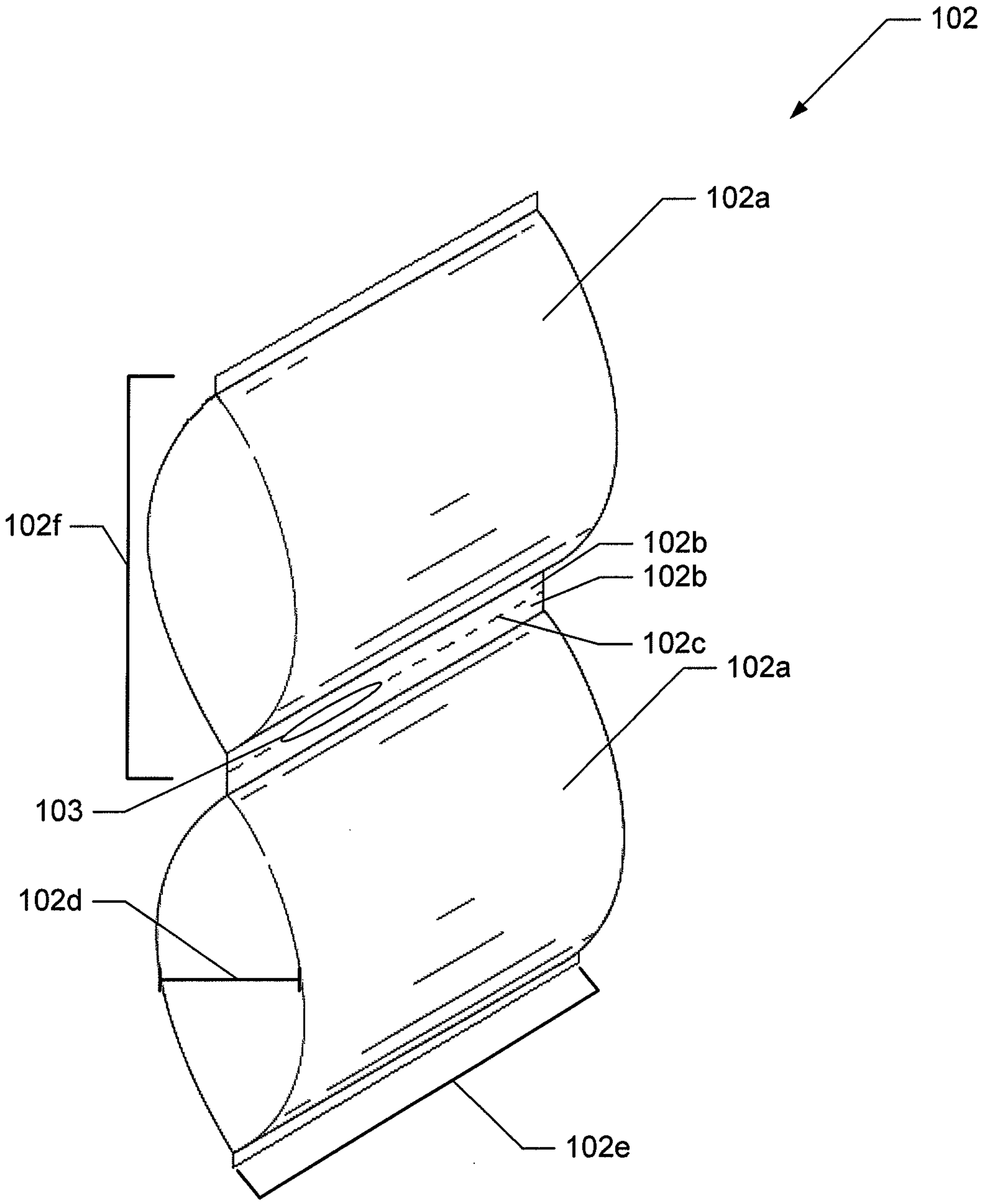
FIG. 3 illustrates an example embodiment of connected inflatable structures which may be dispensed by the system according to an example embodiment of the present invention.

By way of example, FIG. 3 illustrates connected inflatable structures 102 which may be dispensed by the system 100. In the illustrated embodiment, the inflatable structures 102 comprise inflatable chambers 102*a* which are connected by respective peripheral edges 102*b*. Perforations 102*c* or other tear-encouraging features may be provided between the inflatable structures 102 so as to encourage separation thereof. In some embodiments the inflatable structures 102 may comprise one or more slits 103 in addition to or in place of the perforations 102*c* which are configured to encourage tearing of the inflatable structures and which may require relatively less force to induce a tear. The inflatable structures 102 may thus each define a thickness 102*d* and width 102*e* across the inflatable chamber 102*a* and a length 102*f* between the perforations 102*b*. Depending upon the thickness 102*d*, the width 102*e*, the length 102*f* and the specific structural features of the inflatable structures 102, the inflatable structures may engage the dispensing device 156 at different positions. For example, inflatable structures 102 with relatively less air in the inflatable chambers 102*a* may define a lesser thickness 102*d*. Thereby, the inflatable structures 102 which are relatively smaller (e.g. in terms of the thickness 102*d*, width 102*e*, and/or length 102*f*) or relatively less inflated may engage the projections 168 at the first position 174*a*, whereas relatively more inflated inflatable structures and relatively larger inflatable structures may engage the projections at the third position 174*c*, and other inflation levels and inflatable structure sizes may engage the projections at positions therebetween, such as the second position 174*b*. Accordingly, the projections 168 may be configured to engage various embodiments of inflatable structures 102 with varying states of inflation.

With further regard to the dispensing device 156, as noted above the apparatus 150 configured to dispense the inflatable structures 102 may comprise a sensor which outputs a signal that is used by the controller 162 to determine when to instruct the motor 158 to advance the dispensing device. The sensor (not shown) may be configured to detect a pulling force on the dispensing device 156. The pulling force may be detected in a number of ways. For example, in one embodiment the sensor may comprise a strain gauge which detects strain on the projections 168, which is proportional to the pulling force. For example, strain gauges may couple to each of the projections 168 and detect the strain applied to the projections. In another embodiment the sensor may comprise a rotary movement sensor configured to detect a rotational movement of the dispensing device 156 caused by the pulling force. For example, the rotary movement sensor may comprise an encoder such as a Hall Effect sensor which may be positioned in the housing 164. Further, in some embodiments the rotary movement sensor may comprise a back electromotive force sensor which detects rotation of the motor 158 and outputs a voltage corresponding thereto. The back electromotive force sensor may comprise circuitry in some embodiments which detects the voltage outputted from the motor 158. In some embodiments the circuitry may be embodied in the controller 162, although in other embodiments the circuitry may be embodied elsewhere. The signal outputted by the rotary movement sensor may correspond to the rotational movement of the dispensing device 156. For example, when the inflatable structures 102 are draped over the dispensing device 156 and an operator pulls on the inflatable structures (see, e.g., FIGS. 4 and 5), the pulling force may cause the dispensing device to rotate.

Accordingly, the pulling force may be detected using a variety of methods and sensors which may detect the pulling force indirectly through methods such as detecting movement or more directly by detecting strain created by the pulling force, as described above. Further, although the dispensing device 156 has been described above as comprising cylindrical member 160 with a plurality of projections 168 extending therefrom, various other embodiments of the dispensing device may be employed. For example, the dispensing device may comprise a capstan, belts, conveyors, etcetera in other embodiments. Thus, the embodiments of the dispensing device described herein are provided for example purposes only.

Figure 4:
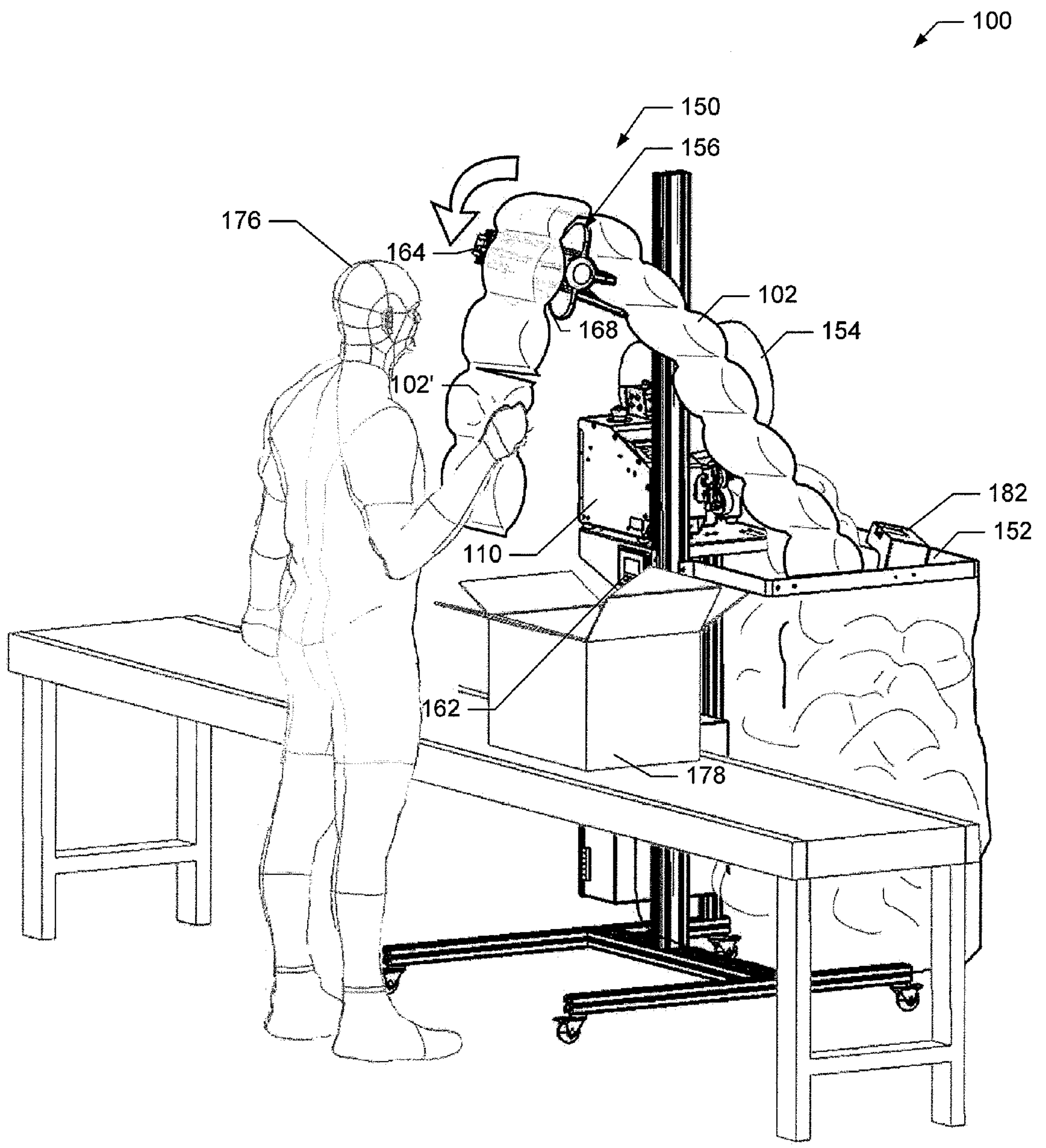
FIG. 4 illustrates the system when an operator is tearing off a section of the connected inflatable structures such that the dispensing device advances the connected inflatable structures after a delay period according to an example embodiment of the present invention.
Figure 5:
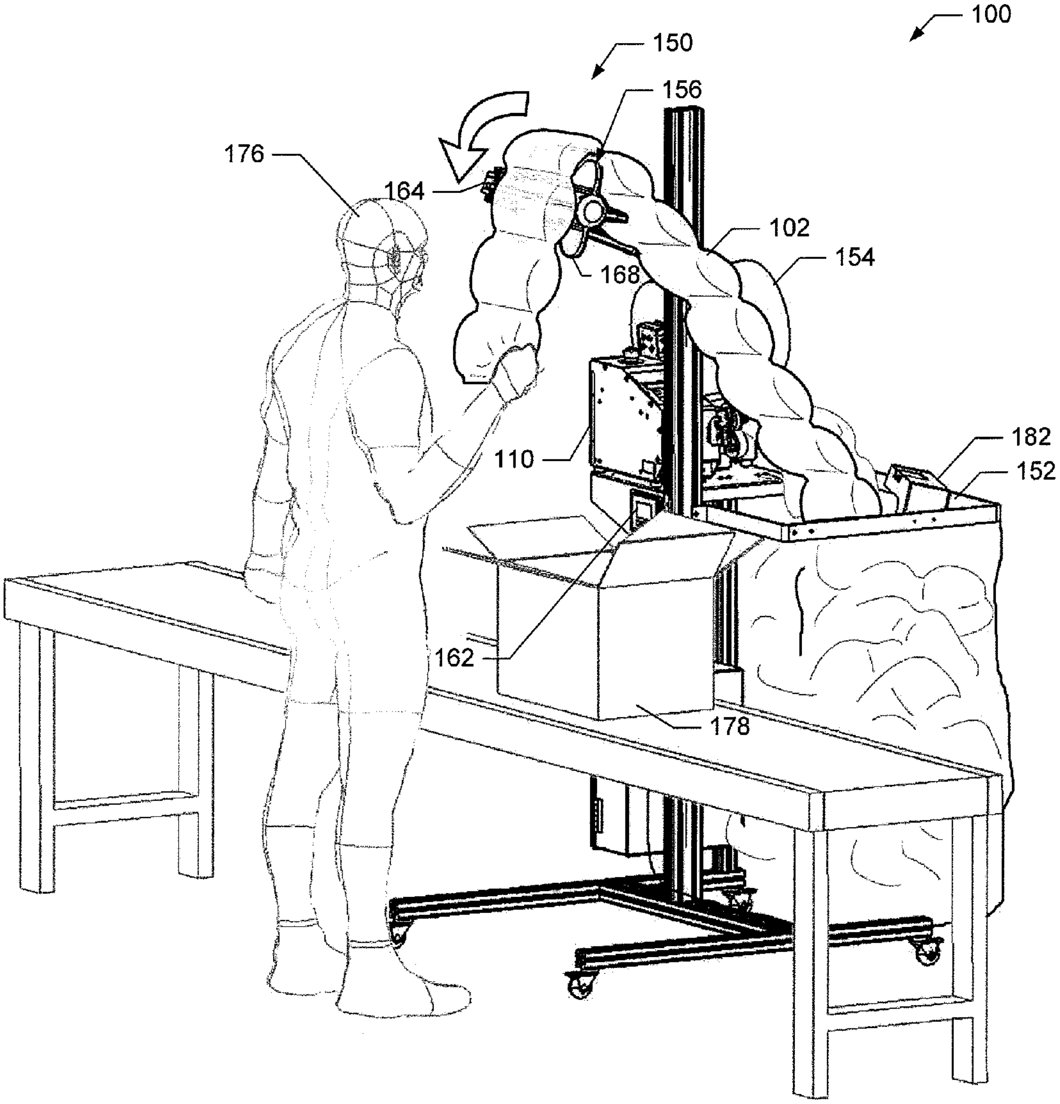
FIG. 5 illustrates the system when an operator is pulling on the connected inflatable structures such that the dispensing device substantially instantaneously advances the connected inflatable structures according to an example embodiment of the present invention.

As noted above, the controller 162 may output a control signal directing the motor 158 to advance the dispensing device 156 in response to a signal outputted by the sensor which detects the pulling force. In this regard, FIGS. 4 and 5 illustrate operation of the system 100 when an operator 176 pulls on the inflated structures 102. In particular, the operator 176 is illustrated as using the inflatable structures for packaging items in a shipping container 178. However, dispensing of the inflatable structures 102 may be used for various other purposes as may be understood by one having skill in the art.

Figure 6:
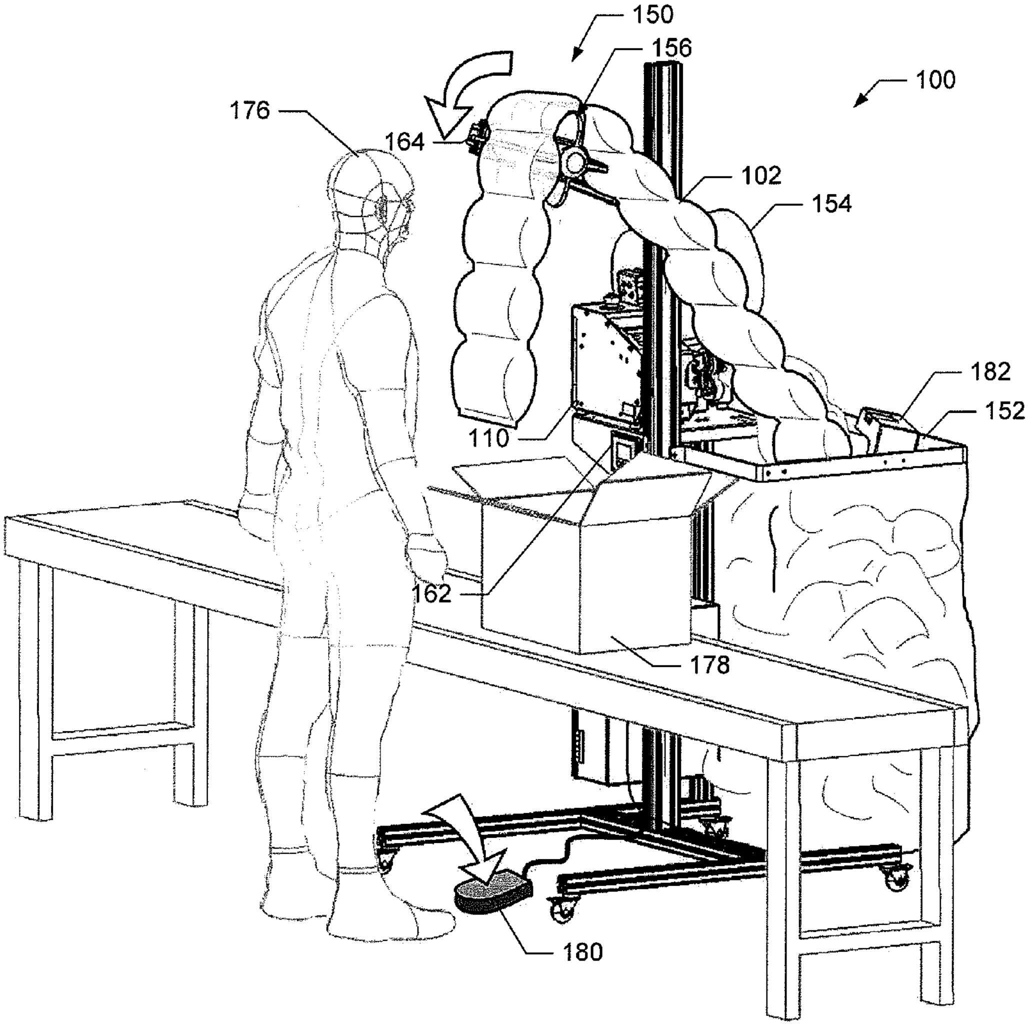
FIG. 6 illustrates the system according to an example embodiment of the present invention in which the system comprises an input device configured to cause the dispensing device to advance the inflatable structures.

FIGS. 4-6 illustrate the system 100 when the inflatable structures 102 have been draped over the dispensing device 156 and hence the system is ready to dispense the inflatable structures. FIG. 4 illustrates the operator 176 tearing off a section 102' of the inflatable structures 102. In this regard, when a desired length or number of the inflatable structures 102 are provided by the dispensing device 156 such that they are accessible to the operator 176, the operator may simply tear off the inflatable structures and use the inflatable structures as desired. However, once the operator 176 tears off the section 102' of the inflatable structures 102, more inflatable structures may be needed in order for the operator to continue using the inflatable structures to package items or for other purposes.

Accordingly, the controller 162 may be configured to advance the dispensing device 156 after a delay period in instances in which the rotational movement, as indicated by the signal, is less than a predetermined threshold, and/or in instances in which a detected strain on the dispensing device lasts for a duration less than a predetermined duration. For example, when the operator 176 tears off the section 102' of the inflatable structures 102, this may involve a relatively quick pull on the inflatable structures. In order to assist the operator 176 in tearing off the section 102' of the inflatable structure 102, the dispensing device 156 may comprise a brake or other mechanism which provides resistance to rotation of the dispensing device. However, in some embodiments the motor 158 and/or an associated gear train may provide sufficient resistance so as to enable the operator 176 to tear off the section 102' of the inflatable structures 102. Also, use of inflatable structures 102 with slits 103 may help the operator separate the inflatable structures by requiring less force to induce the tear and thus assist the controller 162 in determining whether the applied force does or does not result in a tear. Further, the delay period may assist the operator 176 in tearing off the section 102' of the inflatable structures 102. For example, if the controller 162 were to direct the motor 158 to advance the dispensing device 156 instantly, it may be difficult for the operator 176 to tear the inflatable structures 102 due to the movement of the inflatable structures. However, in other embodiments the controller 162 may direct the motor 158 to rotate substantially instantly in order to provide the inflatable structures 102 to the operator 176 more rapidly.

By rotating the dispensing device 156 after the predetermined delay period, the dispensing device may make the inflatable structures 102 once again accessible to the operator 176 by pulling more of the inflatable structures from the accumulation bin 152. In some embodiments the controller 162 may be configured to direct the motor 158 to advance the dispensing device 156 to dispense a predetermined number of the inflatable structures 102 or to advance the dispensing device for a predetermined period of time in instances in which the rotational movement, as indicated by the signal, is less than the predetermined threshold, or the strain on the dispensing device, as indicated by a signal from a strain gauge lasts for less time than a predetermined duration. Thereby, after tearing off the section 102' of the inflatable structures 102, the operator 176 may be provided with a desired number of the inflatable structures or a desired length of the inflatable structures.

FIG. 5 illustrates the operator 176 pulling on the inflatable structures 102 in a manner which does not tear off a section of the inflatable structures (e.g. when the operator "tugs" on the inflatable structures). In this regard, in some instances the operator 176 may need a longer length of the inflatable structures 102 or a larger number of the inflatable structures. Accordingly, the controller 162 may be additionally or alternatively configured to direct the motor 158 to advance the dispensing device 156 substantially instantaneously in instances in which the rotational movement, as indicated by the signal, is greater than a predetermined threshold and/or in instances in which the strain on the dispensing device lasts for longer than a predetermined duration. Thereby, for example, when the operator 176 pulls on the inflatable structures 102 more slowly such that the inflatable structures do not tear, the operator may be provided with additional inflatable structures such that the operator may then tear off a longer section of the inflatable structures, if so desired.

In some embodiments the controller 162 may be configured to direct the motor 158 to advance the dispensing device 156 to dispense a predetermined number of the inflatable structures 102 or to advance the dispensing device for a predetermined period of time in instances in which the rotational movement, as indicated by the signal, is greater than the predetermined threshold and/or in instances in which the strain on the dispensing device lasts for longer than a predetermined duration. Thereby, by pulling more slowly on the inflatable structures 102, the operator 176 may be provided with a desired number of the inflatable structures or a desired length of the inflatable structures.

In some embodiments the predetermined number (or length) of inflatable structures 102 dispensed when the rotational movement is less than the predetermined threshold and/or when the strain lasts for a period of time less than a predetermined duration (i.e. the first predetermined number of the inflatable structures) may be less than the predetermined number (or length) of inflatable structures dispensed when the rotational movement is greater than the predetermined threshold and/or when the strain lasts for a period of time greater than a predetermined duration (i.e. the second predetermined number of the inflatable structures). In this regard, the operator 176 may desire that a smaller number of the inflatable structures 102 be dispensed after tearing off the section 102' of the inflatable structures than when pulling on the inflatable structures so as to not tear off a section. However, the first and second predetermined number of inflatable structures may vary in alternate embodiments. For example, the second predetermined number of inflatable structures may be less than or equal to the first predetermined number of inflatable structures. Further, in some embodiments one or both of the first and second predetermined number of inflatable structures may be user-selectable. For example, the operator 176 may select the first and second predetermined number of inflatable structures using the controller 162 in some embodiments.

Further, although the controller is described above as advancing the dispensing device based on detected rotational movement of the dispensing device and/or duration of strain on the dispensing device, various other methods of analyzing the applied pulling force may be employed as would be understood by one having skill in the art. For example, the controller may compare the magnitude of the strain over the time period in which the pulling force is received to a strain pattern. Thereby, for example, a strain pattern which includes a rapid spike in strain magnitude may be interpreted by the controller as a pulling force which tears off of a section of the inflatable structures. Accordingly, the controller may in such instances advance the dispensing device after a delay period as described above. Conversely, a strain pattern involving a relatively constant strain to the dispending device may be interpreted by the controller as a pulling force which does not tear off a section of the inflatable structures. Accordingly, the controller may in such instances advance the dispensing device substantially instantaneously as described above. Further, various other methods of detecting the type of pulling force applied may be employed as may be understood by one having skill in the art.

Additionally, in some embodiments the controller may be configured to learn based on interaction with the operator. For example, after the operator exerts a pulling force on the inflatable structure, the operator may indicate to the controller which type of pulling force was provided (e.g. tearing or not tearing) and/or the operator may indicate how he or she wants the controller to respond (e.g. by delaying advancement for a delay period or advancing the dispensing device substantially instantaneously). Further, the operator may specify the desired number or length or inflatable structures he or she wants to be dispensed based on the inputted pulling force. Accordingly, the controller may provide additional functionality in some embodiments.

As illustrated in FIG. 6, the system 100 may further comprise an input device 180 configured to cause the motor 158 to advance the dispensing device 156. In the illustrated embodiment, the input device 180 comprises a foot pedal, however various other types of input devices such as switches, buttons, etcetera may be employed as may be understood by one having skill in the art. In some embodiments actuation of the input device 180 for a time period greater than a threshold time period may be configured to cause the motor 158 to advance the dispensing device 156 until actuation of the input device ceases (e.g. by pressing and holding the input device). Further, actuation of the input device 180 for a second time period which is less than the threshold time period may be configured to cause the motor 158 to advance the dispensing device 156 to dispense a predetermined number or length of the inflatable structures 102, for example by rotating the dispensing device for a predetermined length of time (e.g. by tapping the input device). In this regard, the input device 180 may be configured to output an input device signal either directly to the motor 158 or through the controller 162. Thereby, in some embodiments the input device 180 may itself implement control logic, whereas in other embodiments the controller 162 may additionally or alternatively implement control logic based on the input device signal from the input device.

Further, in some embodiments the input device may comprise a bump bar which an operator may actuate, for example by leaning into or pushing against the bump bar using a section of the torso or leg. The bump bar may sense the magnitude of pressure applied by the operator and thereby determine how to dispense the inflatable structures. In some embodiments the bump bar may comprise hydraulic and/or pneumatic components which sense the force applied. The force applied to the bump bar (as may be sensed in terms of pressure) may then determine how to dispense the inflatable structures. For example, less force on the bump bar may cause the dispensing device to dispense the inflatable structures at a relatively slower rate, whereas greater force on the bump bar may cause the dispensing device to dispense the inflatable structures at a relatively faster rate. By way of further example, the speed at which the inflatable structures dispense may be proportional to the force applied to the bump bar. For example, the dispensing speed may linearly increase with increases in the force applied to the bump bar in some embodiments, although other control arrangements may be possible. Thus, the input device may be configured to detect an actuation force applied thereto and configured to control a rate at which the motor advances the dispensing device based on the actuation force.

Thus, as noted above, the controller 162 and in some embodiments the input device 180, may output a signal which directs the motor 158 to advance the dispensing device 156. However, in some instances it may not be desirable for the dispensing device 156 to rotate. For example, as described above, in some embodiments the apparatus 150 configured to dispense the inflatable structures 102 may in some instances be configured to dispense the connected inflatable structures at a rate faster than the inflation device 110 may be able to inflate the connected inflatable structures. As further described above, an accumulation bin 152 may be provided in order to receive and store a buffer quantity of the inflatable structures 102 such that the inflatable structures may substantially always be available to the apparatus 150. However, in some instances the dispensing device 156 may still manage to dispense the inflatable structures 102 at a rate such that most or all of the inflatable structures are removed from the accumulation bin 152. Accordingly, the system 100 may further comprise an inflatable structure sensor 182. The inflatable structure sensor 182 may be configured to detect presence of the inflatable structures 102 positioned downstream of the inflation device 110 and upstream of the apparatus 150 configured to dispense the connected inflatable structures and configured to output a inflatable structure sensor signal indicating whether or not the inflatable structures are present. For example, the inflatable structure sensor 182 may detect whether the inflatable structures 102 are present in the accumulation bin 152. Thereby, the controller 162 may receive the inflatable structure sensor signal from the inflatable structure sensor 182 and not direct the motor 158 to advance the dispensing device 156 in instances in which the inflatable structure sensor signal indicates that the inflatable structures are not present (or present in a quantity less than a predetermined threshold). Thereby, the inflation device 110 may be provided with time to inflate additional inflatable structures 102, or the operator 176 may be provided with an indication that the inflation device is unable to inflate additional inflatable structures, for example, when the roll 154 of the inflatable structures is depleted.

Figure 7:
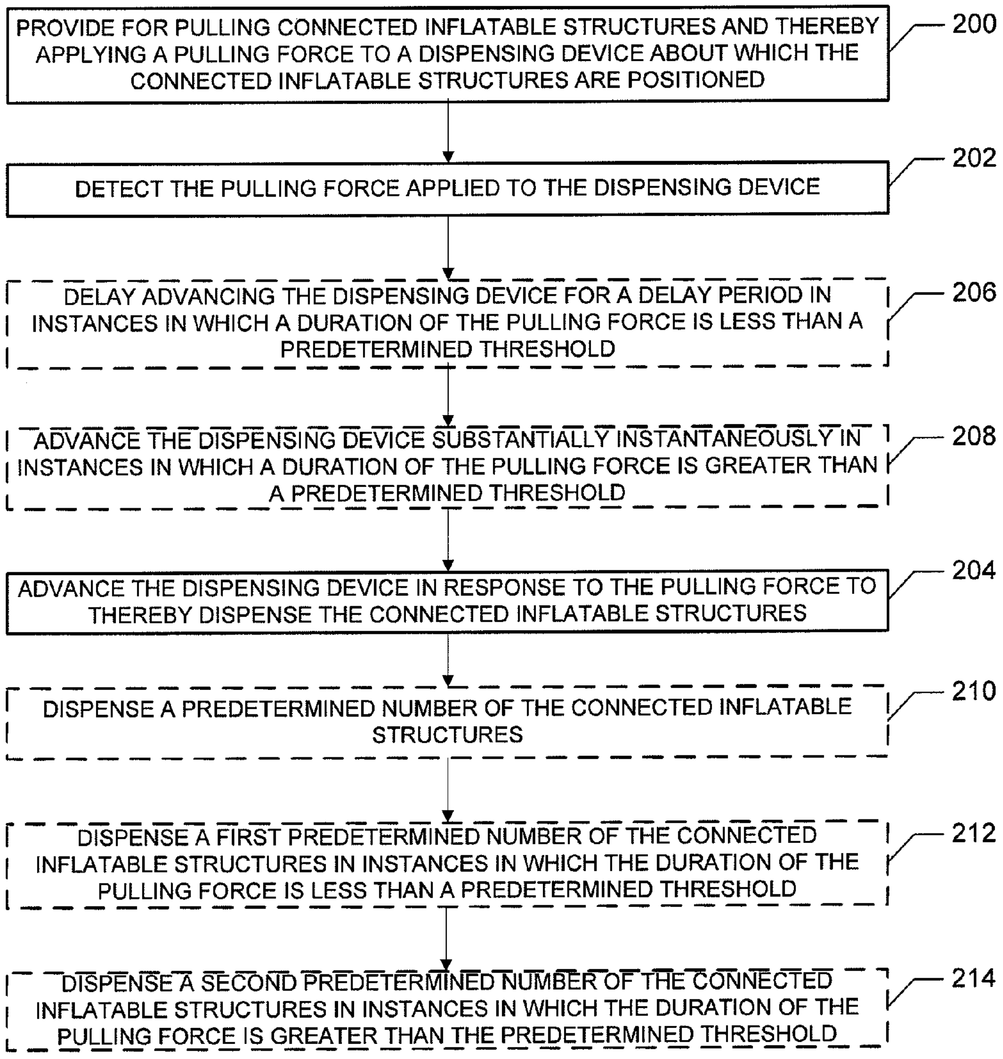
FIG. 7 illustrates a method of dispensing a plurality of connected inflatable structures according to an example embodiment of the present invention.

FIG. 7 illustrates one embodiment of a method of dispensing a plurality of connected inflatable structures. The method may include providing for pulling the connected inflatable structures and thereby applying a pulling force to a dispensing device about which the inflatable structures are positioned at operation 200. Further, the method may include detecting the pulling force applied to the dispensing device at operation 202. The pulling force may be detected directly or indirectly using a variety of sensors and methods as described above. Additionally, the method may include advancing the dispensing device in response to the pulling force to thereby dispense the connected inflatable structures at operation 204.

In some embodiments, certain ones of the above-described operations (as illustrated in solid lines in FIG. 7) may be modified or further amplified. In some embodiments additional operations may also be included (some examples of which are shown in dashed lines in FIG. 7). It should be appreciated that each of the modifications, optional additions or amplifications may be included with the above-described operations (200-204) either alone or in combination with any others among the features described herein. As such, each of the other operations as will be described herein may be combinable with the above-described operations (200-204) either alone or with one, more than one, or all of the additional operations in any combination.

For example, the method may further comprise delaying advancing the dispensing device for a delay period in instances in which a duration of the pulling force is less than a predetermined threshold at operation 206. Additionally, the method may include advancing the dispensing device substantially instantaneously in instances in which a duration of the pulling force is greater than a predetermined threshold at operation 208. Also, the method may include dispensing a predetermined number of the connected inflatable structures at operation 210. Further, the method may comprise dispensing a first predetermined number of the connected inflatable structures in instances in which the duration of the pulling force is less than a predetermined threshold at operation 212. The method may additionally comprise dispensing a second predetermined number of the connected inflatable structures in instances in which the duration of the pulling force is greater than the predetermined threshold at operation 214.

As noted above, the pulling force may be detected using relatively more and relatively less direct methods. For example, when using a rotary movement sensor, a pulling force may produce a rotational movement of the dispensing device which may be sensed. When the movement is relatively small, the pulling force applied to the dispensing device may be considered to be relatively small at least in terms of the duration of the pulling force applied to the dispensing device. For example, a tearing force may cause a small rotational movement and a strain on the dispensing device that ends relatively quickly due to a section of the inflatable structures tearing off. The actual magnitude of the pulling force applied to the dispensing device may depend on the strength of the connection between the inflatable structures, among other factors. Thus, the determination of whether or not the applied pulling force is greater or less than the predetermined threshold may be based on indirect indicators of the pulling force such as the resulting rotational movement of the dispensing device and/or the duration of strain applied to the dispensing device. Accordingly, the determination of whether the applied pulling force is greater or less than a predetermined threshold using the above described methods may or may not be based directly on the magnitude of the applied pulling force.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus configured to dispense a plurality of connected inflatable structures to an operator, the apparatus comprising:

a dispensing device configured to advance the connected inflatable structures to an operator;

a motor configured to advance the dispensing device;

a sensor configured to detect a pulling force applied to the dispensing device by an operator and configured to output a signal corresponding to the pulling force; and a controller configured to receive the signal and output a control signal to direct the motor to advance the dispensing device in response to the signal to thereby dispense the connected inflatable structures to the operator.

2. The apparatus of claim 1, further comprising a plurality of projections extending from the dispensing device, wherein the projections are configured to engage the connected inflatable structures.

3. The apparatus of claim 2, wherein the projections extend a distance from the dispensing device and wherein the distance varies with an axial position along the dispensing device.

4. The apparatus of claim 3, wherein the projections define a U-shape such that the distance defined at a first axial position is less than the distance defined at a second axial position and a third axial position, wherein the first axial position is located between the second axial position and the third axial position.

5. The apparatus of claim 2, wherein the sensor comprises a strain gauge.

6. The apparatus of claim 1, further comprising an input device configured to cause the motor to advance the dispensing device.

7. The apparatus of claim 6, wherein the input device is configured to detect an actuation force applied thereto and configured to control a rate at which the motor advances the dispensing device based on the actuation force.

8. The apparatus of claim 6, wherein actuation of the input device for a time period greater than a threshold time period is configured to cause the motor to advance the dispensing device until actuation of the input device ceases.

9. The apparatus of claim 8, wherein actuation of the input device for a second time period which is less than the threshold time period is configured to cause the motor to advance the dispensing device to dispense a predetermined number of the connected inflatable structures.

10. The apparatus of claim 1, wherein the connected inflatable structures comprise slits.

11. The apparatus of claim 1, wherein the sensor comprises a rotary movement sensor configured to detect a rotational movement of the dispensing device and thereby the signal corresponds to the rotational movement.

12. The apparatus of claim 11, wherein the rotary movement sensor comprises a Hall Effect sensor.

13. The apparatus of claim 11, wherein the rotary movement sensor comprises a back electromotive force sensor.

14. The apparatus of claim 11, wherein the controller is configured to direct the motor to advance the dispensing device after a delay period in instances in which the rotational movement, as indicated by the signal, is less than a predetermined threshold.

15. The apparatus of claim 11, wherein the controller is configured to direct the motor to advance the dispensing device substantially instantaneously in instances in which the rotational movement, as indicated by the signal, is greater than a predetermined threshold.

16. The apparatus of claim 11, wherein the controller is configured to direct the motor to advance the dispensing device to dispense a first predetermined number of the connected inflatable structures in instances in which the rotational movement, as indicated by the signal, is less than a predetermined threshold; and wherein the controller is configured to direct the dispensing device to dispense a second predetermined number of the connected inflatable structures in instances in which the rotational movement, as indicated by the signal, is greater than the predetermined threshold.

17. The apparatus of claim 16, wherein the second predetermined number of the connected inflatable structures is greater than the first predetermined number of connected inflatable structures.

18. The apparatus of claim 16, wherein at least one of the first predetermined number of the connected inflatable structures and the second predetermined number of the connected inflatable structures is user-selectable.

19. A system configured to dispense a plurality of connected inflatable structures to an operator, the system comprising:

an apparatus configured to dispense the connected inflatable structures, comprising:

a dispensing device configured to advance the connected inflatable structures to an operator;

a motor configured to advance the dispensing device;

a sensor configured to detect a pulling force applied to the dispensing device by an operator and configured to output a signal corresponding to the pulling force; and a controller configured to receive the signal and output a control signal to direct the motor to advance the dispensing device in response to the signal to thereby dispense the connected inflatable structures to the operator; and an inflation device configured to inflate the connected inflatable structures.

20. The system of claim 19, further comprising an accumulation bin, wherein the accumulation bin is positioned downstream of the inflation device and upstream of the apparatus configured to dispense the connected inflatable structures.

21. The system of claim 20, further comprising an inflatable structure sensor configured to detect the connected inflatable structures positioned downstream of the inflation device and upstream of the apparatus configured to dispense the connected inflatable structures and configured to output a inflatable structure sensor signal indicating whether or not the connected inflatable structures are present, wherein the controller is configured to not direct the motor to advance the dispensing device in instances in which the inflatable structure sensor signal indicates that the connected inflatable structures are not present.

* * * * *